United States Patent [19]

Gamo et al.

[11] Patent Number: 4,484,287

[45] Date of Patent: Nov. 20, 1984

[54] SYSTEM FOR RESTORING NUMERICALLY CONTROLLED MACHINE TOOL TO FORMER CONDITION

[75] Inventors: Gotaro Gamo; Mitsuo Kinoshita, both of Hachioji, Japan

[73] Assignee: Fujitsu Fanuc Limited, Tokyo, Japan

[21] Appl. No.: 304,903

[22] Filed: Sep. 23, 1981

[30] Foreign Application Priority Data

Sep. 30, 1980 [JP] Japan ................. 55-136607
Sep. 30, 1980 [JP] Japan ................. 55-136608

[51] Int. Cl.³ ................... G06F 15/46; G05B 19/18
[52] U.S. Cl. ................... 364/474; 318/563; 318/632; 364/170; 364/184
[58] Field of Search ........... 364/474, 475, 167-171, 364/184-187; 371/66; 318/563, 565, 567, 569, 632

[56] References Cited

U.S. PATENT DOCUMENTS

| | | | |
|---|---|---|---|
| 3,691,357 | 9/1972 | McIntosh | 364/184 X |
| 3,802,622 | 4/1974 | Nishimura et al. | 318/567 X |
| 3,890,494 | 6/1975 | Meshek et al. | 371/66 |
| 4,045,660 | 8/1977 | Weisgerber et al. | 364/184 X |
| 4,055,787 | 10/1977 | Beadle et al. | 364/184 X |
| 4,107,654 | 8/1978 | Nishijima | 318/569 X |
| 4,370,705 | 1/1983 | Imazeki et al. | 364/184 |

FOREIGN PATENT DOCUMENTS 2033608 5/1980 United Kingdom ............ 219/69 W

Primary Examiner—Joseph F. Ruggiero
Attorney, Agent, or Firm—Staas & Halsey

[57] ABSTRACT

A system for restoring a numerically controlled machine tool to its former condition after a power interruption, the numerical control system being of the type in which a position sensor senses the current position of a movable member or of a drive motor of the machine tool and generates a current position signal in accordance with said current position, the movable member being positioned on the basis of a commanded position signal and the current position signal. The positional control information which prevails immediately prior to an interruption in the electric power which is applied to the machine tool and to the numerical control device is stored in a non-volatile memory before the power interruption occurs. When the electric power is reintroduced, the positional control information is read out of the non-volatile memory, and the movable member is returned to the position which it occupied immediately prior to the power interruption, this being accomplished on the basis of the positional control information and the current position signal.

8 Claims, 5 Drawing Figures

→ Table position

SYSTEM FOR RESTORING NUMERICALLY CONTROLLED MACHINE TOOL TO FORMER CONDITION

BACKGROUND OF THE INVENTION

This invention relates to a system for restoring a numerically controlled machine tool, especially an electric discharge machine, to a former condition. More particularly, the invention relates to a system which allows a machine tool to be restored to the condition of the machine prior to an interruption in power, such as a power failure, after power has been resupplied to the machine.

So-called wire-cut electric discharge machines are well-known in the art. In such machines a wire electrode is tensioned between an upper guide and lower guide, and an electric discharge is produced between the wire electrode and a workpiece placed on a movable table. By moving the table along the X and Y axes following an instructed machining path, the workpiece is transported with respect to the wire electrode so that the wire may cut the workpiece as instructed. When the wire electrode tensioned between the upper and lower guides is retained so as to lie perpendicular to the workpiece, the upper and lower surfaces of the workpiece can be cut into the same shape. It is possible also to adopt an arrangement in which the upper guide can be displaced along the X and Y axes, such as in a direction at right angles to the direction in which the workpiece is travelling, to incline the wire electrode with respect to the workpiece surface. This causes the upper and lower surfaces of the workpiece to be cut differently, enabling so-called taper cutting.

A discharge machining operation performed by the wire-cut discharge machine of the aforesaid type can continue for an extremely long period of time, even for as long as one week in some cases. The workpieces which are cut by electric discharge machining generally are mold materials and the like, and some materials can be extremely expensive. Since an interruption in power can occur during an extended machining period, such as by an operator inadvertently opening a switch or as the result of a power failure, it is desired that cutting be resumed, as soon as power is restored, from the position formerly occupied by the wire electrode prior to the power interruption. Without out such an arrangement the workpiece would have to be discarded and a new workpiece machined from the beginning. For a long-term electric discharge machining operation of up to one week, a power failure can of course occur at night in an unattended plant. A system which is capable of restarting the cutting operation should therefore be able to do so automatically without operator intervention after power is restored.

When power is interrupted certain phenomena occur which make it difficult to realize the desired system. For example, there is destruction of current position and commanded position information with regard to a drive motor and a movable member such as the work table, and destruction of positional control information relating to backlash direction, pitch error compensation number and the like. There is also destruction of interpolation control information, such as may be stored in the counters of a numerical control device, indicative of the process steps executed up until power interruption. Such information may be the interpolation pulse number or the block number, counting from the beginning of the numerical control command data. Another complicating factor is the inertia possessed by the table or motor when power is lost. Such inertia can carry the table over small distances on the order of several microns.

Conventional arrangements have not been able to restart electric discharge machining rapidly from the position occupied before the power interruption, and needless to say they have not been able to restore machining automatically following the return of power. In conventional practice, therefore, the following tedious and complicated procedure must be followed to resume a discharge machining operation:

(1) The discharge machining starting point is stored in advance. For example, this might be set on a digital switch or stored in a non-volatile memory.

(2) Following the restoration of power the wire electrode is removed and the table, or the upper and lower guides which guide the wire electrode, is returned to the zero point of the machine. This brings the position of the table or of the upper and lower wire electrode guides into coincidence with the current position stored in a volatile memory, cleared when power is restored, located within the numerical control device.

(3) Following the return to the machine zero point the table, or the upper and lower wire electrode guides, is positioned at the machining starting point. This is accomplished by using the aforesaid machining starting point information stored previously in the non-volatile memory or set on the digital switch in step (1) above.

(4) Upon completion of the machining starting point positioning operation, the wire electrode is again disposed on the upper and lower guides and tensioned, and the operator returns to the beginning of the numerical control command data.

(5) Next, starting from the data at the beginning of the numerical control command data, the table or wire electrode is transported, as a speed higher than the originally commanded speed, along the path previously machined in accordance with the program. Here a familiar dry-run function can be employed to transport the table or wire electrode at the higher speed.

(6) When the table or wire electrode has reached a position just short of that occupied at the time of the power interruption, the feed speed of the table is restored to the programmed ordinary feed speed for a cutting operation. Then the machining power source is turned on to introduce an electric current to the wire electrode which now starts to cut through the workpiece.

It is obvious from the foregoing that processing following the reintroduction of power is complicated and that a considerable period of time is required to restore the cutting operation. The result is a marked decrease in machining efficiency. Furthermore, since human intervension is necessary, an interruption in machining caused by a power failure which occurs at night or during a holiday will not be remedied until the next working day. Again the obvious result is a decline in efficiency.

SUMMARY OF THE INVENTION

Accordingly, an object of the present invention is to provide a system for restoring a numerically controlled machine tool to a former position, wherein the restarting of a machining operation following the reintroduction of power is accomplished easily and in a short period of time without requiring a return to a zero point, movement to a machining starting point or removal and retensioning of a wire electrode.

Another object of the present invention is to provide a system for restoring a numerically controlled machine tool to a former position, wherein machining is resumed automatically, and wherein the restarting of a machining operation following the reintroduction of power is accomplished easily and in a short period of time without requiring a return to a zero point, movement to a machining starting point or removal and retensioning of a wire electrode.

The present invention is based on the fact that positional control information and interpolation control information stored in the memory of a numerical control device for a wire-cut electric discharge machine are destroyed when power is interrupted, and upon the fact that a table or other movable portion of the machine traverses a very small distance of several microns upon a power interruption. Accordingly, (a) if the movable member such as the table can be returned to the position which it occupied immediately before the interruption in power, and (b) if the status of the numerical control device, such as the values stored in its counters, can be restored to what it was immediately before the interruption in power, then it should be possible to resume the discharge machining work once power is restored. Further, if the condition (b) can be fulfilled automatically, then it should be possible for the discharge machining work to resume automatically once power is restored, even after a power loss interruption by a power failure or the like.

In accordance with the present invention, therefore, the movable member such as the table is returned to the position which it occupied immediately before the power interruption by preserving in a non-volatile memory the positional control information which prevailed prior to the interruption, and by using a position sensor capable of sensing the absolute position of the movable member or of a drive motor. After power is restored, said positional control information preserved in the non-volatile memory, and the absolute position sensed by the sensor, are employed for positioning the movable member or, more specifically, for returning the movable member to the position which it occupied prior to the interruption in power.

To restore the status of the numerical control device to what it was before the power interruption, the position of a block of numerical control command data prevailing just prior to the interruption, and interpolation information indicative of the interpolation pulse number in said block, are stored in a non-volatile memory. Then, after power is restored, the motor and table are locked against movement, and processing is executed sequentially starting from the numerical control command data in the first block of said data. This processing stops temporarily when the position of the block and the interpolation pulse number based on the numerical control command data in said block coincide with the position of the block and the interpolation pulse number, respectively, stored in the non-volatile memory. The status of the numerical control device is thus made to coincide with what it was immediately prior to the interruption in power.

In another aspect of the invention, the movable member such as the table is returned to the position which it occupied immediately before the power interruption in the manner described above but in fully automatic fashion by providing an automatic power introduction apparatus which introduces electric power to the numerical control device and the like automatically when the main power supply is restored. Also, in order to restore the status of the numerical control device to what it was before the power interruption in a fully automatic manner, the position of a block of numerical control command data prevailing just prior to the power interruption, and interruption information indicative of the interpolation pulse number in said block, are stored in a non-volatile memory as described above. Then, in accordance with this aspect of the invention, the beginning of the numerical control command data is retrieved so that numerical control processing can be executed again starting from the beginning of said data. After the power is restored, processing takes place a described above to restore the status of the numerical control device automatically.

These and other features and advantages of the present invention will be apparent from the following description taken in conjunction with the accompanying drawings.

DESCRIPTION OF THE PREFERRED EMBODIMENT

Figure 1:
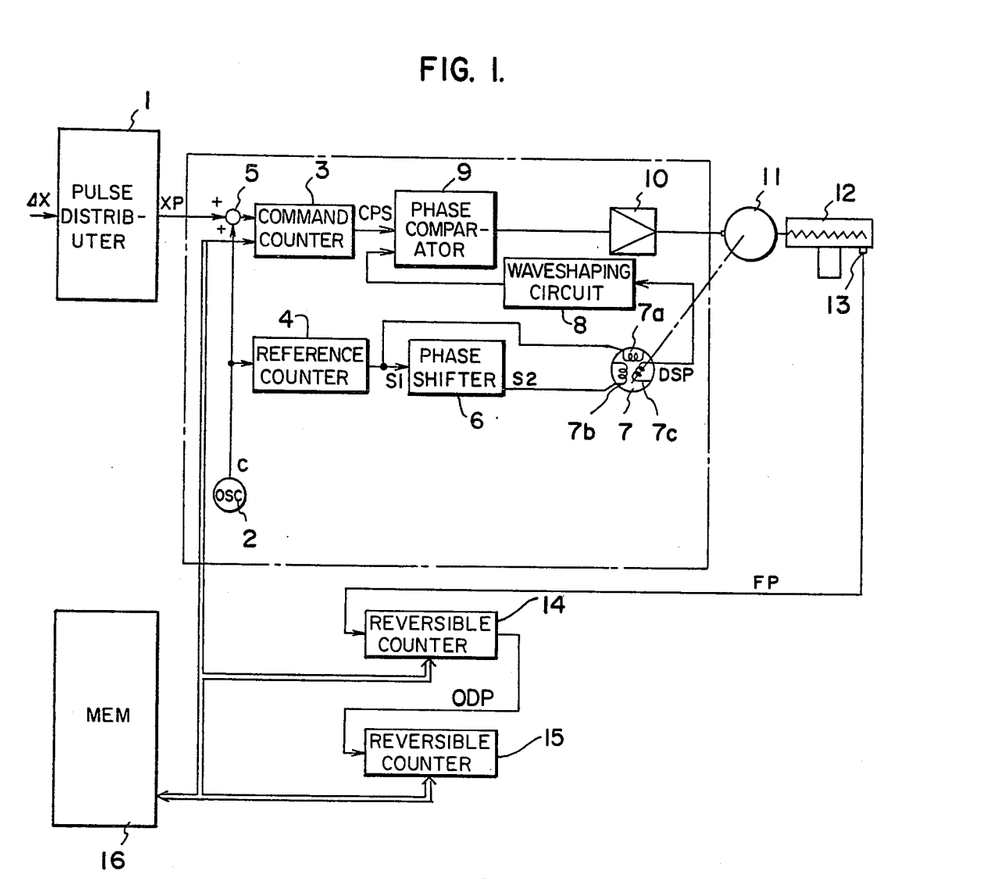
FIG. 1 is a circuit block diagram of a portion of a system for restoring a numerically controlled machine tool to a former position in which a movable part of the machine tool, such as a table, can be restored to the position occupied immediately before a power interruption after said power has been reintroduced, this being accomplished even when the movable part, or a drive motor, has moved under the influence of inertia following the loss of power.

The manner in which a movable member such as a table is returned to the position which it occupied prior to a power loss will be described with reference to FIG. 1, which is a block diagram of one portion of a system in accordance with the present invention. Specifically, the portion illustrated in FIG. 1 is for the restoration of position along the X-axis only in order to simplify the description. Operation proceeds in a like manner for other controlled axes.

In FIG. 1 a pulse distributor 1 generates distributed pulses $X_p$ by performing a pulse distribution operation on the basis of a positional command $\Delta X$. An oscillator 2 generates a pulse train $C_p$ of a constant frequency. The distributed pulses $X_p$ from the pulse distributor 1 and the pulse train $C_p$ from the oscillator 2 are applied to a mixing circuit 5 which is adapted to mix the pulses $X_p$, $C_p$. A command counter 3 adds the pulses $X_p$, $C_p$ received from the mixing circuit 5 and generates a command phase signal CPS which emerges from the flip-flop stage constituting the most significant bit. A reference counter 4, having the same capacity as the counter 3, counts the pulses $C_p$ received from the oscillator 2 and generates a signal $S_1$ which emerges from the flip-flop stage constituting the most significant bit. A phase shifter 6, which receives the signal $S_1$ from the reference counter 4, produces a signal $S_2$ which is the result of advancing or retarding the phase of signal $S_1$ by $\pi/2$. The signals $S_1$, $S_2$ are delivered to a resolver 7 which includes stator windings 7a, 7b arranged with an angle of $\pi/2$ or 90° between them, and a rotor winding 7c which rotates in accordance with the rotation of a DC motor 11 for driving a movable member, which will be taken as a table in the preferred embodiment. The inputs to the stator windings 7a, 7b are the signals $S_1$, $S_2$, respectively, while the rotor winding 7c produces a detection phase signal DSP the phase of which is shifted by the angle of rotation $\theta$ of the rotor winding. The signal DSP is applied to a wave shaping circuit 8 such as a Schmitt trigger, the output of the wave shaping circuit 8 being coupled to a phase comparator 9 whose other input is the command phase signal CPS from the command counter 3. The phase comparator 9 compares the phases of the command phase signal CPS and the detection phase signal DSP and produces an output voltage which is proportional to the phase difference between CPS and DSP. The output voltage is delivered to an amplifier 10 whose output is in turn connected to the DC motor 11. Numeral 12 denotes the table driven by motor 11. A position sensor 13, such as an Inductsyn (tradename), is mounted on the table 12 and is adapted to generate a single feedback pulse FP, which may be a positive (forward direction) feedback pulse or a negative (reverse direction) feedback pulse depending upon the direction of movement of table 12, the feedback pulse FP being generated each time table 12 moves by a predetermined amount. A presettable reversible counter 14 receives the feedback pulses FP and has its content counted up or counted down by the pulses in accordance with the direction of table movement, the counter producing a pulse ODP for taking a figure up one place, i.e., for a carry, or for taking a figure down one place, i.e., for a "borrow" operation. A reversible counter 15 has its content counted up or counted down by the pulse ODP. A non-volatile memory 16 stores the contents of counters 14, 15, namely the values that prevail immediately before an interruption in power. The pulse distributor 1, oscillator 2, command counter 3, reference counter 4, phase shifter 6, resolver 7, wave shaper 8, phase comparator 9, amplifier 10 and DC motor 11 form a well-known phase comparison-type closed-loop servo circuit. It should be noted again that the circuit of FIG. 1 is for control along only one axis, namely the X-axis. In actual practice, circuits of identical construction are provided for each controlled axis.

The arrangement of FIG. 1 operates as follows. The phase comparison-type closed loop servo circuit drives the DC motor 11 by generating an analog voltage, delivered by the phase comparator 9, which is in accordance with the phase difference between the command phase signal CPS produced by the command counter 3 and the detection phase signal DSP produced by the resolver 7, and by applying this voltage to the DC motor 11 upon amplification by amplifier 10. As the DC motor rotates, the rotor winding 7c of resolver 7 revolves so that the phase of detection phase signal DSP is shifted in accordance with the amount of rotation, the circuit operating to bring the phase of signal DSP into coincidence with the phase of signal CPS. In other words, the servo circuit drives the DC motor 11, which in turn transports the table 12, in such a manner that the phase difference between the signals CPS, DSP approaches zero. The servo circuit stops driving the motor when the phase difference is reduced to zero.

During the above operation of the servo circuit, the position sensor 13 mounted on table 12 is generating the positive or negative feedback pulses FP in accordance with the direction of table movement, each pulse being generated whenever the table moves by a predetermined amount. The feedback pulses enter the reversible counter 14. The content of reversible counter 14 is up-counted by positive feedback pulses and down-counted by negative feedback pulses, again in accordance with the direction of table movement, and delivers the pulse ODP whenever a predetermined number of feedback pulses have arrived. The pulse ODP acts as a carry pulse which up-counts reversible counter 15, or as a borrow pulse which down-counts reversible counter 15. Consequently, if reversible counters 14, 15 are reset to zero when the table 12 is returned to the zero point prior to a machining operation, and if the foregoing reversible counting operations are then performed as described, the contents of the reversible counters 14, 15 will indicate the current position of the table 12. Control for a pitch error compensation or for a stored stroke limit can be performed simply on the basis of the reversible counter contents.

The contents of reversible counters 14, 15 are constantly being transferred to and stored in non-volatile memory 16 through a polling control technique using a control circuit which is not shown. The transmission of the information to memory 16 takes place at predetermined intervals which are extremely short. Therefore, when the polling control time interval is decided upon taking into consideration the very slow feed speed of an electric discharge machine, for example, the current position of the table at any time will, in effect, be stored in the reversible counters 14, 15 and in the non-volatile memory 16.

Now, assume that power is interrupted without warning, perhaps as the result of a power failure. The current position of table 11 will remain preserved in non-volatile memory 16 by virtue of the foregoing operation, despite the power interruption. When power is reintroduced and the content of non-volatile memory 16 transferred back to the reversible counters 14, 15, therefore, the current position of table 11 and the value indicated by reversible counters 14, 15 should be in agreement without requiring that the table be returned to the zero point. In fact, however, the above will hold true only so long as the table does not move following the interruption in power. Such movement, on the order of several microns, can and does occur owing to the inertia possessed by the table at the instant of power loss. When such is the case, the value presented by reversible counters 14, 15 will not give a true indication of current table position. The present invention deals with this situation in a manner to be described below. First, so-called grid points will be defined and described with reference to FIG. 2.

Figure 2:
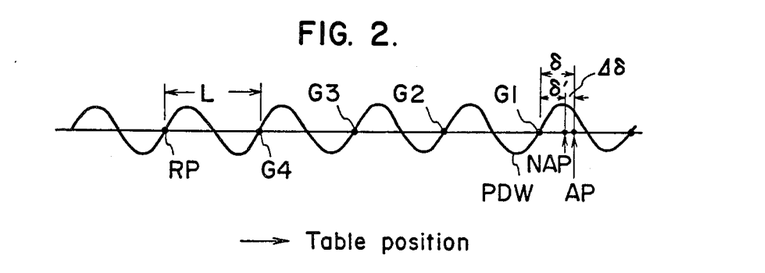
FIG. 2 is an illustrative view useful in explaining grid points.

The resolver 7 generates a position signal as the rotor winding 7c revolves, one period of the signal corresponding to one revolution of the rotor. In other words, one revolution of the resolver is equivalent to an amount L (mm) of table movement. If the position of the table is plotted along the horizontal axis as shown in FIG. 2, each period of the position signal, designated PDW, will correspond to the unit of table movement L. The points $G_1$, $G_2$, $G_3$... and so on where the position signal PDW crosses the zero line are referred to as grid points, one grid point occurring every unit of movement L.

Returning now to FIG. 1, assume that the position sensor 13 generates N pulses during one revolution of resolver 7, that is, during the time it takes table 11 to traverse L millimeters, and assume that the capacity of reversible counter 14 is N. The reversible counter 15 will then in effect count the number of grid points starting from the machine zero point RP (FIG. 2), and the reversible counter 14 will count the number of pulses corresponding to a distance δ measured from a grid point to the position AP of the table. When power is lost, the table 12 will, owing to its inertia, travel by an amount Δδ. Assume then the table moves by Δδ from the point AP to the point NAP. Though power is lost, the contents of reversible counters 14, 15 that prevailed immediately prior to the power loss (namely the distance δ from a grid point and the number of grid points) will be preserved in non-volatile memory 16. When power is reintroduced, a numerical value corresponding to the distance δ from the grid point is sent from the non-volatile memory 16 to the command counter 3 where the numerical value is set. The command phase signal DPS generated by command counter 3 will therefore have a phase corresponding to the distance δ. Meanwhile, since the resolver 7 is generating the detection phase signal DSP whose phase will correspond to the distance δ' (where δ=δ'+Δδ), the phase comparator 9, which compares the phases of the signals CPS, DSP, produces an analog voltage signal which is proportional to the phase difference between the input signals, this phase difference corresponding to the positional deviation Δδ (i.e., Δδ=δ−δ'). This analog voltage, or phase difference signal, drives the DC motor 11 upon amplification in amplifier 10. As a result, the table is moved and then brought to rest at the position it occupied immediately before the interruption in power. It should also be noted that the values indicated by the reversible counters 14, 15 immediately before the power interruption, and which are stored in the non-volatile memory 16, can be made to coincide with the table position by now presetting these values back in the respective reversible counters from the memory 16. When the table is moved in conjunction with the resumed machining operation, therefore, these values will be updated in accordance with the feedback pulses FP as described above.

Figure 3:
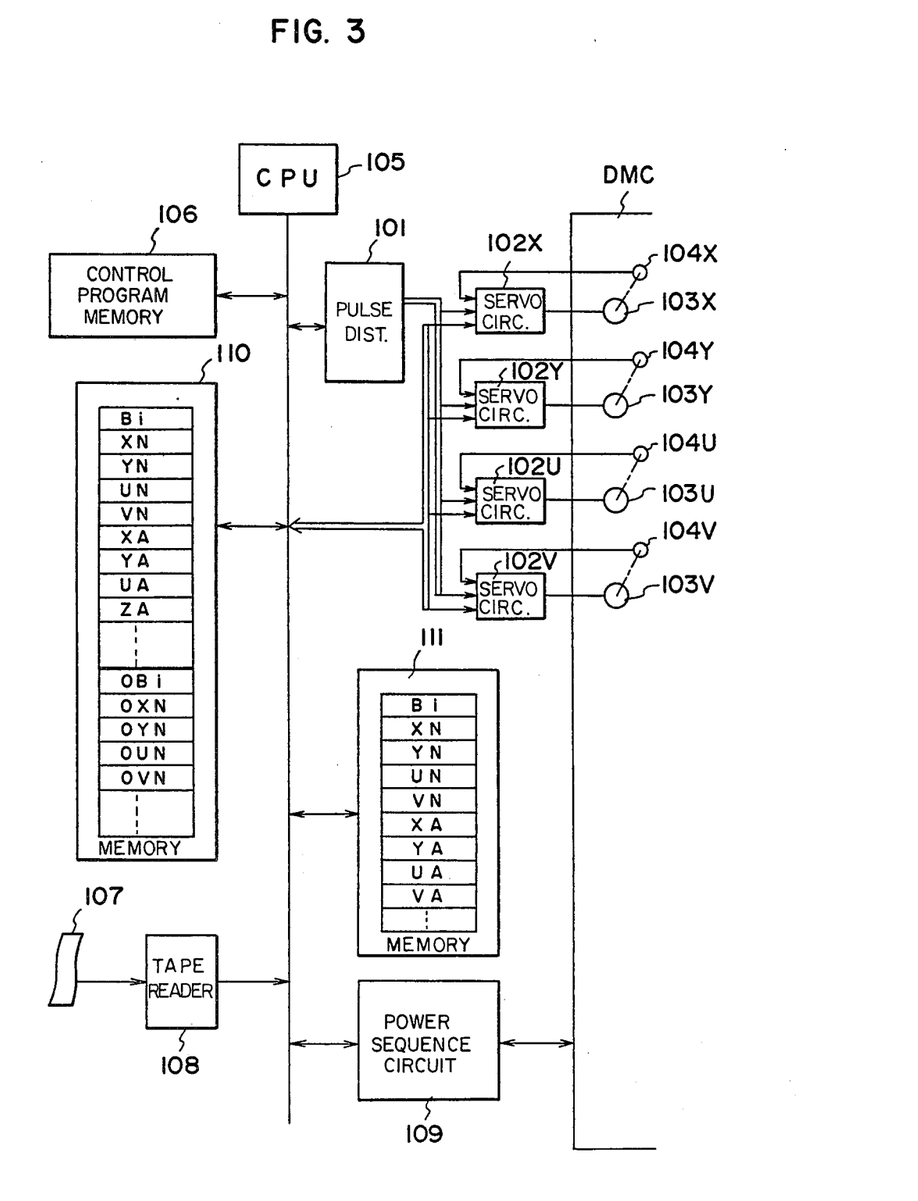
FIG. 3 is a circuit block diagram for realizing the present invention when the invention is applied to an electric discharge machine having four controlled axes.

Reference will now be had to FIG. 3 to describe the overall method of restoring the status of the numerical control device, such as the status of the memory within the numerical control device, to what it was immediately before the interruption in power.

FIG. 3 is a block diagram for realizing the present invention when it is applied to an electric discharge machine having four controlled axes. In FIG. 3, numeral 101 denotes a pulse distributor. Pulses from the pulse distributor 101 are delivered to servo circuits 102X, 102Y, 102U, 102V for the four controlled axes X, Y, U and V, respectively, these servo circuits corresponding to the servo circuit depicted in FIG. 1. DC motors 103X, 103Y, 103U, 103V and resolvers 104X, 104Y, 104U, 104V are provided in accordance with the abovementioned controlled axes. The table and position sensor are not illustrated in FIG. 3. A central processing unit 105 executes a predetermined numerical control process on the basis of a control program and on the basis of numerical commands read from a paper tape 107 in which said commands are punched. The control program is stored in a control program memory 106 which is a read-only memory (ROM). A tape reader 108 is provided to read the paper tape 107. A power sequence control circuit 109 administers the exchange of digital data between the discharge machine, denoted DMC, and the numerical control device. Numeral 110 denotes a high-speed memory, namely a random access memory (RAM). The RAM 110 stores the position $B_i$ of that block of the numerical control data which is currently being processed (namely the number of the block counting from the first block of data), the interpolation pulses, or the remaining interpolation pulses, XN, YN, UN, VN in said block $B_i$ for each of the control axes X, Y, U, V, backlash compensation directions BCX, BCY, BCU, BCV, pitch error compensation dock numbers PEX, PEY, PEU, PEV, inch-to-metric conversion error quantities, speed-up error quantities, and the actual position of the table XA, YA, UA, VA along each of the axes (corresponding to the contents of the reversible counters 14, 15 in FIG. 1), etc., all of the above relating to said block $B_i$, for the respective control axes. Numeral 111 designates a non-volatile memory which corresponds to the non-volatile memory 16 of FIG. 1. In the present arrangement, the central processing unit 105 responds to commands from the control program to transfer and to store the content of RAM 110 in the non-volatile memory 111 at extremely short, predetermined time intervals. This is the polling control operation mentioned above.

When electric power is restored following an interruption caused by a power failure or the like, the table is restored to the position which it occupied prior to the power interruption in the manner described in connection with FIG. 1. Also, the information $B_i$, XN, YN, UN, VN ... and so on preserved in non-volatile memory 111 by virtue of the polling operation is transferred back to the RAM 110 as $OB_i$, OXN, OYN, OUN, OVN ... and stored there. The operator, meanwhile, in parallel with the table restoration operation or following the completion thereof, rewinds the paper tape 107 to position it at the first block of data. Then, under the control of the control program, the table is locked against movement after it has been restored to the position occupied prior to the power interruption, and processing is executed by a dry run from the first block of data on the paper tape. To lock the table against movement as mentioned above, use need only be made of a gate circuit for opening the connections between the output terminals of the pulse distributor 101 and the input terminals of the servo circuits 102X through 102V. The gate circuit is not illustrated in the drawing.

When the symbol "*" (block end) is read in from the paper 107 under the control of the control program, the central processing unit 105 performs the operation:

$$B_i + 1 \rightarrow B_i \qquad (1)$$

where the initial value of $B_i$ is zero, thereby to advance the block number by one. The CPU 105 also causes $B_i$ to be compared with the block number $OB_i$ which prevailed immediately before the power interruption. When $B_i$ and $OB_i$ do not coincide, processing is executed on the basis of the numerical control commands read from the paper tape 107. For example, when a move command is read, the move command values ΔX, ΔY, ΔU, ΔZ and the feed speed F are fed into the pulse distributor 101 which responds by executing the prescribed pulse distribution operations. It should be noted, however, that the distributed pulses for the respective control axes do not enter the servo circuits 102X through 102V in this case because the gate circuit mentioned above is open in order to lock the table against movement. On the other hand, when the distributed pulses are generated, the numbers of remaining interpolation pulses XN, YN, UN, VN are counted down one-by-one under the control of the CPU 105.

When the pulse distribution operation is completed, namely when the numbers of remaining interpolation pulses XN, YN, UN, VN for the respective axes are reduced to zero, the next block of numerical control command data is read from the paper tape 107, the operation specified by Equation (1) is performed when "*" is read at the end of the block, and $B_i$ is compared with $OB_i$. When $B_i$ and $OB_i$ do not coincide, processing is again executed as described above. The above continues until $B_i$ and $OB_i$ are brought into coincidence by reading in the predetermined block.

When the coincidence between $B_i$ and $OB_i$ is established, the following operations:

$$XN-1 \rightarrow XN$$

$$YN-1 \rightarrow YN$$

$$UN-1 \rightarrow UN$$

$$VN-1 \rightarrow VN \quad (2)$$

are performed in connection with the respective axes each time a pulse is distributed by the pulse distributor 101 owing to the numerical control command data in the last read-in block. Following completion of these operations, XN and OXN, YN and OYN, UN and OUN, VN and OVN are compared, and the pulse distribution operation is halted temporarily at the instant all of these values coincide. The status of the numerical control device now is exactly as it was prior to the power interruption.

The foregoing series of operations thus restore the machine and the numerical control device to the states that prevailed just prior to the interruption in power. Therefore, when the machining power is restored to again supply the machining fluids and to energize the wire electrode, discharge machining can be resumed immediately after power is introduced to the machine.

Figure 4:
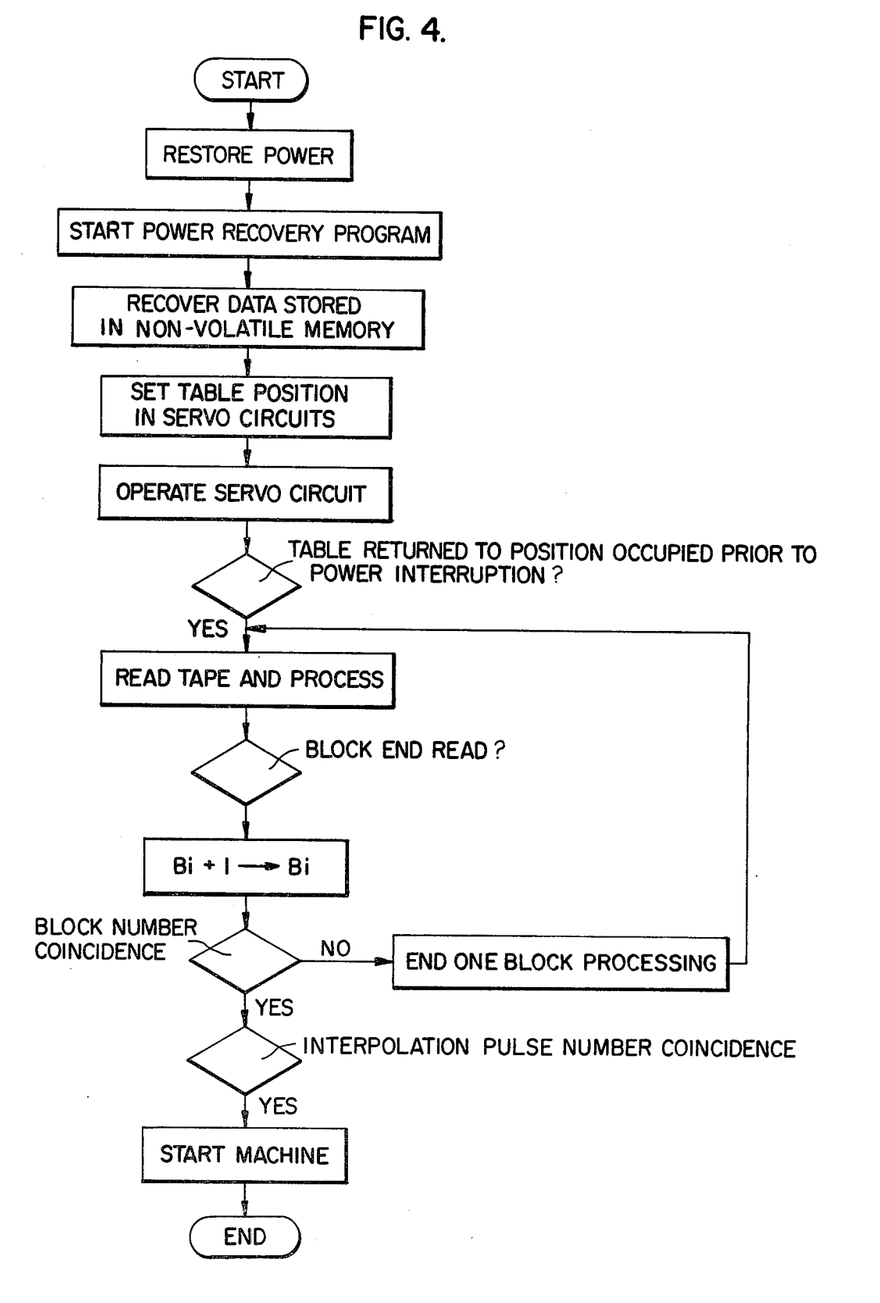
FIG. 4 is a flow chart useful in describing processing in accordance with the present invention.

To facilitate understanding of the restoration processing set forth above, there is illustrated in FIG. 4 a flow chart outlining the restoration process following the reintroduction of power.

Figure 5:
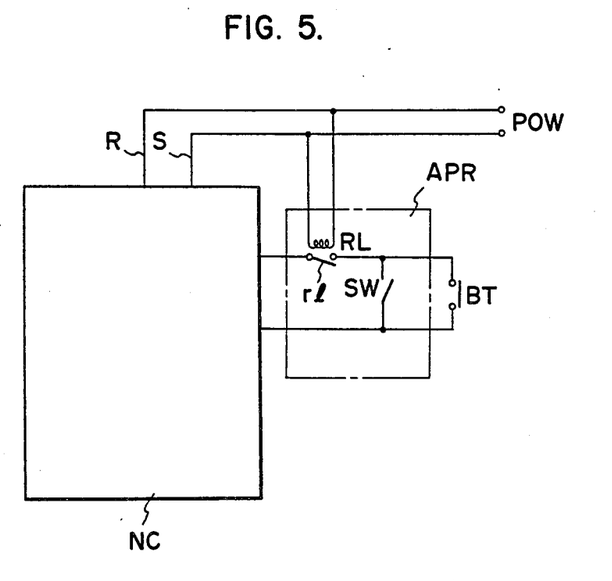
FIG. 5 is a circuit diagram of an apparatus for automatically introducing electric power.

Reference will now be had to FIG. 5 to describe another embodiment of the invention, namely a method of introducing power to the numerical control device in a fully automatic manner when the main power supply has been restored. Specifically, FIG. 5 is a circuit diagram of an apparatus for automatic power introduction. NC denotes the numerical control device, POW the main power supply, and APR the automatic power introduction apparatus proper, which includes a power button BT for introducing power, a relay RL, and a switch SW for automatically introducing power following a power failure. In operation, the switch SW normally is open. To introduce power to the numerical control device NC, the operator presses the power button BT. Specifically, when the main power source POW is delivering power, relay RL is in the energized state so that the contact is closed. When the operator presses the power button BT under these conditions, a relay or the like (not shown) located inside the numerical control device NC is energized. This forms a closed current path so that the numerical control device NC may receive power over the power lines R, S. When machining is to be carried out by operating the numerical control device continously at night or, of course, at any other time, the operator closes switch SW beforehand. Then, if power is interrupted because of a power failure or carelessness, the switch SW will function in the same manner as the power button BT when power from the main power supply POW is restored, thereby supplying the numerical control device NC with voltage automatically without intervention by the operator.

After the numerical control device NC is supplied with voltage automatically as described above, the table is returned to the position occupied prior to the power interruption. In parallel with this operation, or after it is completed, the numerical control device NC executes a control sequence from the machining starting point to the point at which power was lost. The operations which take place in order to accomplish this will now be described.

In parallel with or after the table restoration operation, the control program causes a retrieval command to be sent to the tape reader, which responds by retrieving the numerical control command data at the beginning of the paper tape. The paper tape reader 108 does this by running the paper tape 107 backwards while a retrieval circuit located within the tape reader reads out the numerical control information word-by-word and interprets each word. Since a G92 code will have been punched in the paper tape at the beginning of the discharge machining program, the retrieval circuit of the tape reader will eventually read out and interpret this code. When this occurs, the motor of the tape reader 108 is immediately stopped, thereby halting the tape at the code G92. This ends the retrieval operation. The tape reader 108 thus is placed in a condition where it can again start to read the numerical control command data sequentially in the forward direction starting from G92, i.e., from the beginning of said data.

In the foregoing the numerical control command data enters from the paper tape 107. However, there may be a case where the data is stored beforehand in memory, with numerical control being executed by sequentially reading the data out of the memory. This is referred to as a memory run control operation. When such is the case, the address of the data at the beginning of said command data can be found by reading the command data out of the memory backwardly and in sequence until the code G92 is recovered. It is also possible to store the first address in a nonvolatile memory in advance.

Following the retrieval of the command data at the beginning of the paper tape 107 and the restoration of the table to the position occupied prior to the power interruption, the electric discharge machine tool is locked against movement and numerical control processing is executed by a dry run starting from the command data at the beginning of the paper tape. This occurs under the control program as mentioned above.

When the foregoing automatic resetting operation using the apparatus of FIG. 5 is completed, machining is resumed, in accordance with the machining program stored on the paper tape or the like, as described above with reference to FIGS. 1 through 3.

In accordance with the present invention as described in detail above, operability is greatly simplified since a movable member such as a table need not be returned to the machine zero point nor be positioned at the cutting starting point, and since the wire electrode need not be removed and then replaced and retensioned. Furthermore, when the movable member such as the table traverses a small distance owing to inertia when power is interrupted, the table can be positioned at the point occupied immediately prior to the power loss automatically in a short period of time without returning the table to the machine zero point or to the cutting starting point, and without moving the table from the cutting starting point to the point occupied prior to the power loss. The result is a major improvement in machining efficiency. In addition, since the position of the movable member and the current position stored in the memory of the numerical control device can be made to coincide, and since it is possible to restore pitch error compensation dog position and backlash direction correctly, highly precise positional control can be effected after the resumption of machining.

Furthermore, by providing the automatic power introduction apparatus, machining can be resumed automatically without human intervention. This means that machining can be resumed even at night or in an unattended factory when a power failure occurs, followed by a power restoration. This eliminates a decline in efficiency caused by a lengthy interruption in machining.

As may apparently widely different embodiments of the present invention can be made without departing from the spirit and scope thereof, it is to be understood that the invention is not limited to the specific embodiment thereof except as defined in the appended claims.

What we claim is:

1. In a numerical control system for a numerically controlled machine tool in which a position sensor senses the current position of a movable member or of a drive motor of the machine tool and delivers a current position signal in accordance with said current position, the movable member being positioned on the bases of a commanded position signal and aid current position signal, a system for restoring the numerically controlled machine tool to a former condition, which comprises:
   a non-volatile memory;
   means for sampling and storing current positional information, which prevails immediately prior to an interruption in electric power to the machine tool and the numerical control system, in said non-volatile memory before said power interruption occurs, the current positional information being sampled and stored before said power interruption occurs;
   means for reading the current positional information out of said non-volatile memory when electric power is reintroduced; and
   means for returning the movable member of the machine tool to the position which said movable member occupied immediately prior to said power interruption, on the basis of said current positional information read out of said non-volatile memory and said current position signal generated by said position sensor.

2. In a numerical control system for a numerically controlled machine tool in which a position sensor senses the current position of a movable member or of a drive motor of the machine tool and delivers a current position signal in accordance with said current position, the movable member being positioned on the basis of a commanded position signal and said current position signal, a system for restoring the numerically controlled machine tool to a former condition, which comprises:
   a non-volatile memory;
   means for storing positional control information which stores digital values indicating at least the current position of the movable member with respect to a predetermined point, the current position according to a machining program, backlash correction information, and pitch error compensation information, which prevails immediately prior to an interruption in electric power, in said non-volatile memory before the power interruption occurs;
   means for reading the positional control information out of said non-volatile memory when electric power is reintroduced; and
   means for returning the movable member of the machine tool to the position which said movable member occupied immediately prior to the power interruption, on the basis of said positional information read out of said non-volatile memory and said current position signal generated by said position sensor.

3. In a numerical control system for a numerically controlled machine tool in which a position sensor senses the current position of a movable member or of a motor of the machine tool and delivers a current position signal in accordance with said current position, the movable member being positioned on the basis of a commanded position signal and said current position signal, a system for restoring the numerically controlled machine tool to a former condition, which comprises:
   a non-volatile memory;
   means for storing (a) positional control information which prevails immediately prior to an interruption in electric power, (b) information specifying the block of numerical control command data read immediately prior to the interruption in electric power, and (c) interpolation information indicating one of the number of interpolation pulses which were interpolated, up to the point in time immediately prior to the interruption in electric power, and the number of remaining interpolation pulses up to said point in time, in said non-volatile memory before the power interruption occurs;
   a volatile memory;
   means for transferring to said volatile memory the information (a), (b) and (c) preserved in said non-volatile memory when electric power is reintroduced, said information being stored in said volatile memory;
   means for returning the movable member of the machine tool to the position which said movable member occupied immediately prior to the power interruption, on the basis of said positional control information transferred to and stored in said volatile memory and said current position control signal generated by said position sensor;
   means for executing numerical control processing sequentially from the beginning of the numerical control command data with the movable member of the machine tool being locked against movement;
   means for bringing a block of numerical control command data into coincidence with the block of numerical control command data transferred to and stored in said volatile memory; and means for bringing one of the number of interpolation pulses interpolated owing to the numerical control command and the number of remaining interpolation pulses into coincidence with one of the number of interpolation pulses and the number of remaining interpolation pulses transferred to and stored in said volatile memory;

whereby the conditions which prevailed immediately prior to the interruption in electric power are restored.

4. A system according to claim 3, wherein the machine tool is an electric discharge machine.

5. In a numerical control system for a numerically controlled machine tool in which a position sensor senses the current position of a movable member or of a drive motor of the machine tool and delivers a current position signal in accordance with said current position, the movable member being positioned on the basis of a commanded position signal and said current position signal, a system for restoring the numerically controlled machine tool to a former condition, which comprises:

retrieval means for retrieving the beginning of numerical control command data;

automatic power introduction means for introducing electric power to the numerical control system automatically after the restoration of electric power from a main power supply following the interruption of said electric power;

a non-volatile memory;

means for storing (a) positional control information which prevails immediately prior to an interruption in electric power, (b) information specifying the block of numerical control command data read immediately prior to the interruption in electric power, and (c) interpolation information indicating one of the number of interpolation pulses which were interpolated, up to the point in time immediately prior to the interruption in electric power, and the number of remaining interpolation pulses up to said point in time, in said non-volatile memory before the power interruption occurs;

means for recovering the information (a), (b) and (c) preserved in said non-volatile memory when electric power is introduced;

means for returning the movable member of the machine tool to the position which said movable member occupied immediately prior to the power interruption, on the basis of said recovered positional control information and said current position control signal generated by said position sensor;

means for executing numerical control processing sequentially from the beginning of the numerical control command data, retrieved by said retrieval means, with the movable member of the machine tool being locked against movement;

means for bringing a block of numerical control command data into coincidence with the recovered block of numerical command control data; and means for bringing one of the number of interpolation pulses interpolated owing to the numerical control command and the number of remaining interpolation pulses into coincidence with one of the recovered number of interpolation pulses and the recovered number of remaining interpolation pulses;

whereby the conditions which prevailed immediately prior to the interruption in electric power are restored.

6. A system according to claim 5, wherein the means for storing information (a), (b) and (c) stores positional control information indicating the current position of the movable member prior to the power interruption.

7. A system according to claim 5, wherein the machine tool is an electric discharge machine.

8. A system according to claim 5, wherein an identifying code is attached to the beginning of the numerical control command data.

* * * * *

UNITED STATES PATENT AND TRADEMARK OFFICE
CERTIFICATE OF CORRECTION

PATENT NO. : 4,484,287

DATED : November 20, 1984

INVENTOR(S) : GOTARO GAMO ET AL

It is certified that error appears in the above-identified patent and that said Letters Patent is hereby corrected as shown below:

Col. 1, line 47, delete "out".

Col. 2, line 38, "as" should be --at--;
    line 57, "vension" should be --vention--.

Col. 4, line 16, "a" should be --as--.

Col. 8, line 16, "onversion" should be --conversion--.

Col. 10, line 53, "nonvolatile" should be --non-volatile--.

Col. 11, line 42, "bases" should be --basis--;
    line 43, "aid" should be --said--.

Signed and Sealed this

Fourteenth Day of May 1985

[SEAL]

Attest:

DONALD J. QUIGG

Attesting Officer     Acting Commissioner of Patents and Trademarks